US010027659B2

(12) United States Patent
Hillis

(10) Patent No.: US 10,027,659 B2
(45) Date of Patent: *Jul. 17, 2018

(54) SECURITY INFORMATION CACHING ON AUTHENTICATION TOKEN

(71) Applicant: Applied Invention, LLC, Burbank, CA (US)

(72) Inventor: W. Daniel Hillis, Toluca Lake, CA (US)

(73) Assignee: Applied Invention, LLC, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,762

(22) Filed: Nov. 9, 2016

(65) Prior Publication Data

US 2017/0054714 A1    Feb. 23, 2017

Related U.S. Application Data

(63) Continuation of application No. 15/062,501, filed on Mar. 7, 2016, now Pat. No. 9,529,992, which is a continuation of application No. 14/151,327, filed on Jan. 9, 2014, now Pat. No. 9,319,393.

(60) Provisional application No. 61/828,931, filed on May 30, 2013.

(51) Int. Cl.
| H04L 29/06 | (2006.01) |
| G06F 21/34 | (2013.01) |
| G06F 21/35 | (2013.01) |
| G06F 21/36 | (2013.01) |
| G06Q 20/20 | (2012.01) |

(52) U.S. Cl.
CPC .......... *H04L 63/0853* (2013.01); *G06F 21/34* (2013.01); *G06F 21/35* (2013.01); *G06F 21/36* (2013.01); *G06Q 20/206* (2013.01); *H04L 63/08* (2013.01); *H04L 63/083* (2013.01); *H04L 2463/082* (2013.01)

(58) Field of Classification Search
CPC .... G06F 21/30; H04L 63/083; H04L 63/0853
See application file for complete search history.

(56) References Cited

U.S. PATENT DOCUMENTS

| 6,480,958 B1 | 11/2002 | Harrington et al. |
| 7,685,430 B1 | 3/2010 | Masurkar et al. |
| 8,879,728 B2 | 11/2014 | Offrey et al. |
| 9,160,545 B2 | 10/2015 | Iverson et al. |
| 2005/0195975 A1 | 9/2005 | Kawakita et al. |
| 2008/0098120 A1 | 4/2008 | Johnson et al. |
| 2008/0133914 A1 | 6/2008 | Isaacson et al. |
| 2008/0235144 A1 | 9/2008 | Phillips et al. |

(Continued)

*Primary Examiner* — Dao Q Ho
(74) *Attorney, Agent, or Firm* — Michael A. Glenn; Perkins Coie LLP

(57) ABSTRACT

A method of operating a security token to authenticate a user in a multi-factor authentication system is disclosed. The method includes: monitoring user custody of the token, the token having an identifying characteristic representing a possession factor for use through possession factor authentication; during a period of continuous user custody of the token based on the monitoring, obtaining a knowledge factor from a user having the continuous user custody; caching the knowledge factor in a memory of the token; and in response to a second authentication request, retrieving the knowledge factor from the memory to demonstrate to an authentication system knowledge of the knowledge factor, during the period of continuous user custody.

29 Claims, 7 Drawing Sheets

(56) References Cited

U.S. PATENT DOCUMENTS

| | | |
|---|---|---|
| 2009/0147949 A1 | 6/2009 | Kirovski et al. |
| 2010/0138667 A1 | 6/2010 | Adams et al. |
| 2011/0087890 A1 | 4/2011 | Munsil et al. |
| 2011/0252234 A1 | 10/2011 | De Atley et al. |
| 2012/0144466 A1 | 6/2012 | Ohkado et al. |
| 2013/0305039 A1 | 11/2013 | Gauda |
| 2014/0244494 A1 | 8/2014 | Davis et al. |
| 2014/0359744 A1 | 12/2014 | Hillis |
| 2015/0310231 A1 | 10/2015 | Lin et al. |

SECURITY INFORMATION CACHING ON AUTHENTICATION TOKEN

CROSS-REFERENCE TO RELATED APPLICATIONS

This application is a continuation of U.S. patent application Ser. No. 15/062,501, entitled "SECURITY INFORMATION CACHING ON AUTHENTICATION TOKEN," filed on Mar. 7, 2016, which is a continuation of U.S. patent application Ser. No. 14/151,327, entitled "SECURITY INFORMATION CACHING ON AUTHENTICATION TOKEN," filed on Jan. 9, 2014, which issued as U.S. Pat. No. 9,319,393 on Apr. 19, 2016, which claims the benefit of U.S. Provisional Patent Application No. 61/828,931, filed May 30, 2013, where the entire content of the above applications are incorporated herein by reference in their entirety.

TECHNICAL FIELD

This disclosure relates to a security system, and more particularly, to a multi-factor authentication system.

BACKGROUND

Multi-factor authentication is an approach implemented in security systems to provide redundancy in security, such as in digital transactions. For example, under the multi-factor authentication scheme, before a transaction (e.g., a login or an electronic purchase) is authorized, a user must correctly produce or demonstrate possession or control of two or more of:

A possession factor, i.e., something the user has;
A knowledge factor, i.e., something the user knows; and
An inherence factor, i.e., something the user is.

A conventional two-factor authentication based on a possession factor and a knowledge factor is one approach that may be taken. For example, this approach is implemented in various financial instruments, such as the use of automatic teller machine (ATM) cards at a point of sale (POS), where a user must possess the ATM card and know the correct personal identification number (PIN) associated with the ATM card in order to gain access. For another example, a security token password managers, such as in RSA Security's SecureID token, a user provides a numeric sequence generated and displayed by the token and a password or PIN from the user's memory in order to gain access to an electronic system.

While the conventional two factor authentication systems do provide a high level of security, entering the required credentials is inconvenient (e.g., tedious and/or time consuming). Even if the presentation of the possession factor (i.e., "something you have") is automated, e.g., with a swipe of a magnetic strip or the USB connection of a security token, requirement of regular presentation of the knowledge factor (i.e., "something you know") can be frustrating for a user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Disclosed technology involves a technique of using a security token acting as a possession factor in a multi-factor authentication system to cache a knowledge factor (e.g., a passcode, a personal identification number (PIN), a birthday, or a personal phone number) for an uninterrupted duration of custody. The technique enables a single device to demonstrate both the possession factor and the knowledge factor to authenticate access without vitiating the benefits provided by multi-factor authentication. Multi-factor authentication is designed to prevent a malicious party from gaining access by stealing a security token to gain access to an authentication system. With a security token capable of caching a knowledge factor and automatically flushing its cache upon detection of a loss of custody, the security token would be able to provide security redundancy while enabling convenience of a combined presentation of both the knowledge factor and the possession factor to gain access.

In various embodiments, a user's custody of a security token is monitored, where the security token serves as a possession factor of a multi-factor authentication system (e.g., a two-factor authentication system requiring a possession factor and a knowledge factor). During a period of continuous user custody, a knowledge factor is obtained from the user in response to a first authentication request. The knowledge factor is then cached in a memory onboard the security token. The knowledge factor can be retrieved from the memory of the security token by the authentication system in response to a second authentication request. Optionally, the retrieval may be in response to a manual authorization from the user through a user interaction with either the security token or the authentication system. In some embodiments, the cached knowledge factor may be retrieved from the memory by the authentication system, in response to any other authentication requests following the first authentication request and before the continuous user custody is broken. The technique of monitoring for user custody of the security token eliminates the inconvenience of having to repeatedly provide the knowledge factor. If continuous user custody of the security token is affirmatively broken or otherwise cannot be guaranteed, the cached knowledge factor is removed from memory, thus ensuring security provided by the multi-factor authentication system.

Figure 4:
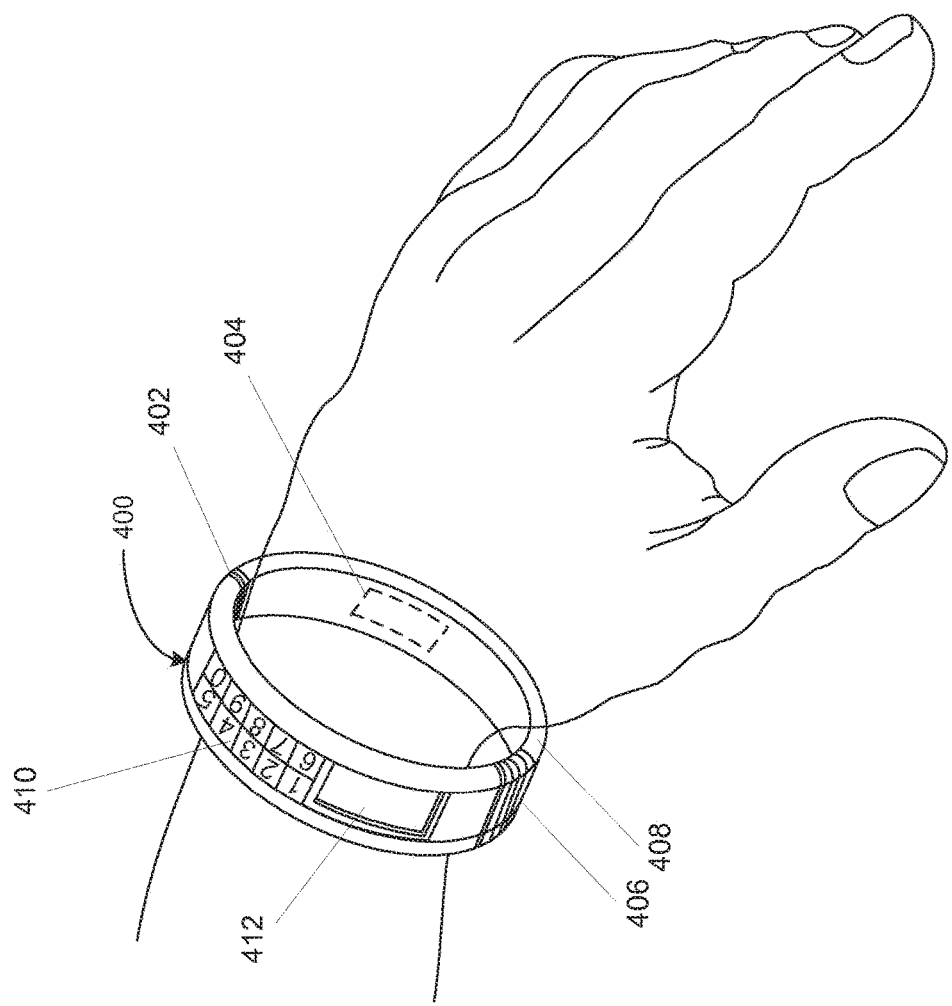
FIG. 4 is a diagram of a bracelet token, in accordance with various embodiments.

To illustrate the disclosed technique in an example, the token can a hinged bracelet, such as illustrated in FIG. 4, which snaps snugly around a user's wrist, i.e., it cannot be slid off of the wrist without opening. Snapping the bracelet around the wrist closes a switch monitored by a controller (e.g., a microprocessor) within the bracelet. Monitoring the integrity of the circuit closed by the switch allows the controller to confirm continuous user custody of the bracelet.

In this example, during a period of continuous custody, the user provides the knowledge factor for authentication in a multi-factor authentication process only once. For example, the user can provide the knowledge factor via a keypad as shown in FIG. 4. Once the user produces the knowledge factor, e.g., a PIN, password, or pattern, the controller caches the knowledge factor within a memory onboard the bracelet. For subsequent authentications within the period of continuous custody, the bracelet presents both the possession factor (itself, such as a pattern/code permanently stored within its memory) and the knowledge factor (from the cache) to the party or system requesting authentication. A variety of approaches to monitor user custody of the security token are possible, based at least in part on how the user keeps the token in his/her proximity (e.g., by wearing the token or by placing the token in a pocket) and the form factor of the security token.

A security token serving as a possession factor in a multi-factor authentication system may take on different form factors, including a wearable device (e.g., an ankle bracelet, a pair of eye glasses, a necklace, a watch, or a ring), a portable device (e.g., a coin-shaped device or a business card shaped device), a mobile device (e.g., a phone, a tablet, or a remote), a tag (e.g., a keychain, a Velcro tag, or a wallet tag), an embedded device (e.g., a device within another device), an implant (e.g., a device for implantation within a substrate or body), or any combination thereof. Variations from the bracelet form factor example are possible, including anklets, necklaces, earrings, and other clamping or securing mechanisms with which the token may be reliably secured around or to the user's body. Other examples include a medallion worn around the user's neck or a patch secured on the user using an elastic band. The token may be planar, round, spherical, or rectangular in shape. The knowledge factor may take on different semantic structures, including a pass-phrase, a sequence of numbers, a sequence of alphanumeric symbols/digits, a pattern, an image, an audio sequence, a personal answer to a question, a correct interpretation of a stimulus presented, or any combination thereof.

Figure 5A:
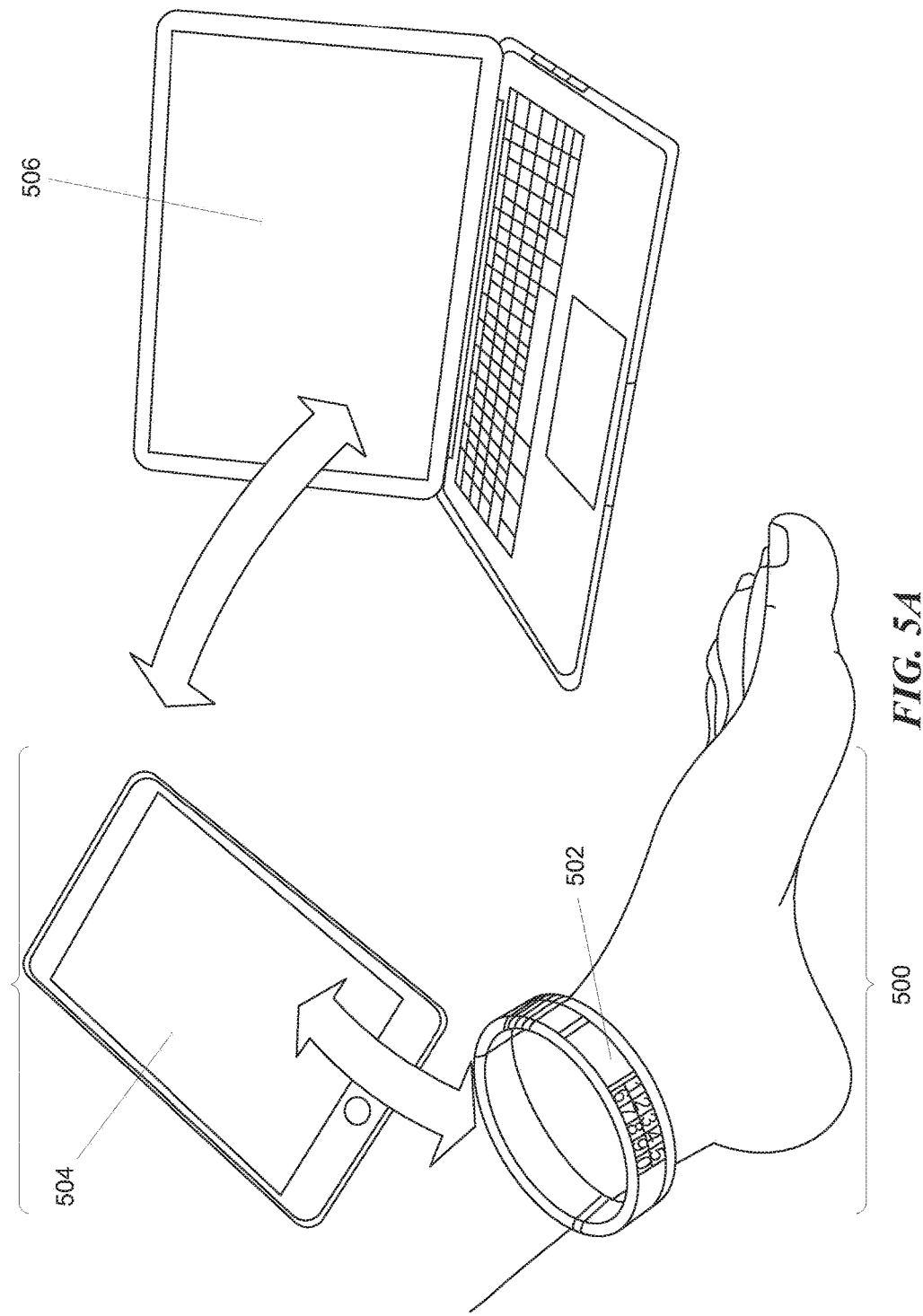
FIG. 5A is a diagram of a security token system implemented by a first sub-token as exemplified by an ankle band and a second sub-token as exemplified by a smartphone, according to at least one embodiment.

In at least one embodiment, the security token can comprise two sub-tokens that are separable. A first sub-token may be implanted or otherwise securely fixed within or to a user's body. The first sub-token enables the authentication system to track the user's custody of the security token more easily. A second sub-token may remain unattached to the user's body. The second sub-token enables the user to present the security token to the authentication system (e.g., for verifying the possession factor and/or the knowledge factor) without having to remove or detach the first sub-token from his/her body. An example of this embodiment is shown in FIG. 5A, where an ankle band serves as the first sub-token and a smartphone serves as the second sub-token for authenticating an e-commerce transaction conducted via a laptop computer. A controller onboard the second sub-token confirms continuous possession by monitoring continual proximity between the first and second sub-tokens.

Figure 1:
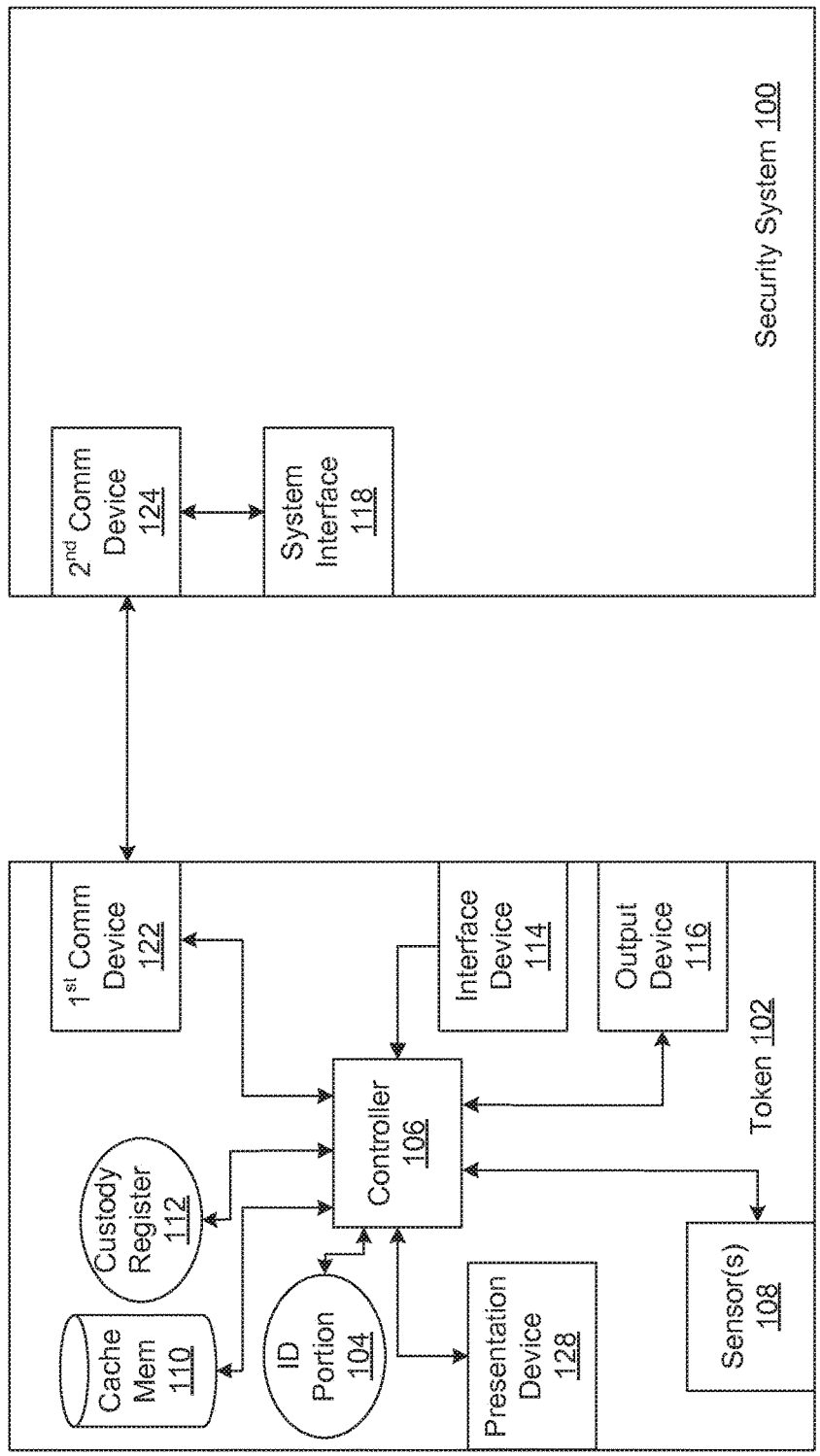
FIG. 1 is a diagram illustrating a security system that authenticates a user via a token capable of caching a knowledge factor, in accordance with various embodiments.

FIG. 1 is a diagram illustrating a security system 100 that authenticates a user via a token 102 capable of caching a knowledge factor, in accordance with various embodiments. The security system 100 may be a multi-factor authentication system, including at least a knowledge factor authentication and a possession factor authentication as defined above. The security system 100 may be a computer system implemented by one or more computing devices. The security system 100 may also include one or more persons verifying the possession factor, knowledge factor, and/or inherence factor from a user. The token 102 may serve to provide data necessary for both knowledge factor authentication and possession factor authentication.

The token 102 may possess a unique or rare identifying characteristic embodied in an identification portion 104 when interacting with the security system 100. The security system 100 may be configured to detect the identifying characteristic when the token 102 is within a range of the security system 100 and/or when a user requests for access through the security system 100. In some embodiments, the identification portion 104 may be a memory or a piece of memory permanently storing an identification data representing the identifying characteristic. In other embodiments, the identifying characteristic may be an engraved pattern or printed code on a surface of the token 102.

The token 102 may include a controller 106. The controller 106 is a device for executing electronic instructions. The controller 106 may be a microprocessor, an application specific integrated circuit (ASIC), a field programmable gate array (FPGA), or other electronic logics circuitry.

The token 102 may include one or more sensors 108. Measurements from the sensors 108 may be streamed to the controller 106 for processing. Alternatively, the controller 106 may access measurements from the sensors 108 that are stored in a buffer. The sensors 108 record measurements indicative of user custody of the token 102. For example, where the token 102 is a wearable token, the sensors 108 can determine whether or not the token 102 is being worn by or attached to a user in a continuous fashion. For example, the sensors 108 may include a switch, a camera, a temperature sensor, a geo-location sensor, an accelerometer, a pressure sensor, or other sensors capable of determining whether or not a user has a continuous custody of the token 102. When the token 102 has a form factor where it can be worn on or around a user, the sensors 108 and the controller 106 can monitor continuous possession by confirming, e.g., using capacitive measurements, constant contact between the token and the user's skin. For more secure custody monitoring, the controller can continually acquire biometric measurements of the user through the sensors 108.

The token 102 may include a cache memory 110. The cache memory 110 is a device capable of storing digital or analog information, such as volatile or non-volatile memory. For example, the cache memory 110 may be flash memory, random access memory (RAM), disk memory, other solid-state, electronic, magnetic, optical, chemical, quantum, or mechanical memory. In some embodiments, the identification portion 104 may be part of the cache memory 110, as a memory space storing the identifying characteristic of the possession factor.

The cache memory 110 may be used to cache a knowledge factor (e.g., a passcode) for authenticating a user with the security system 100. Whether or not the cache memory 110 is storing any knowledge factor is controlled by the controller 106 based on a custody register 112. The custody register 112 may be a portion of the cache memory 110 or other mechanism for storing a binary flag.

The controller 106 processes the measurements from the sensors 108 and determines whether or not the token 102 is in custody of a user. While the measurements indicate that the token 102 is in continuous custody by the user, the controller 106 ensures that the custody register 112 is in an on state. Whenever the controller 106 determines that custody of the token 102 by the user is lost, the controller 106 turns the custody register 112 to an off state. Loss of custody may include a period of time when the token 102 is changing hand from one user to another. Loss of custody may also include when the token 102 is left behind at a location while the original user moves away.

When the custody register 112 is in an off state, the controller 106 ensures that the cache memory 110 wipes knowledge factor from its memory space, such as writing over existing memory, zeroing out digital memory, demagnetizing magnetic memory, or flushing the memory space electronically. For example, wiping of the knowledge factor from the cache memory 110 may be in response to and immediately after the controller 106 turns the custody register 112 to an off state.

When no existing knowledge factor is stored in the cache memory 110, the controller 106 may request input of a knowledge factor from a user through an interface device 114. The interface device 114 is a device for capturing user input. For example, the interface device 114 may be a touchscreen, a keyboard, one or more dials, one or more buttons, or any combination thereof. Optionally, the interface device 114 may be coupled to an output device 116 to provide feedback to the user, such as a display component or an audio output component. The output device 116 may be part of the interface device 114 or a separate component controlled by the controller 106. After a user inputs the knowledge factor through the interface device 114, the knowledge factor is stored in the cache memory 110.

In some embodiments, the controller 106 makes a request for input of the knowledge factor in response to the controller 106 changing the custody register 112 to an on state. In other embodiments, the controller 106 makes a request for input of the knowledge factor in response to the token 102 receiving an authentication request from the security system 100 or from a user of the token 102 (e.g., via the interface device 114).

In alternative embodiments, the knowledge factor may be inputted through the security system 100 to the cache memory 110. In those cases, when the security system 100 determines that authentication is required, the security system 100 checks for the identifying characteristic in the token 102 as the possession factor and requests a user of the token 102 to input the knowledge factor on a system interface 118 of the security system 100. If the security system 100 authenticate the user, the security system 100 may then transfer the knowledge factor to the token 102 for caching in the cache memory 110.

In some embodiments, the token 102 may include a first communication device 122 and the security system 100 may include a second communication device 124, where the first communication device 122 is configured to communicate with the second communication device 124. Authentication requests may be sent from either the first communication device 122 to the second communication device 124 or vice versa. Transfer of the knowledge factor to and from the token 102 may also be communicated through the first communication device 122.

When the custody register 112 is in an on state and when a knowledge factor associated with the user and the security system 100 is stored in the cache memory 110, the controller 106 may send the knowledge factor automatically to the security system 100 whenever authentication is needed (e.g., whenever the token 102 or the security system 100 receives an authentication request). Controlling of the caching of the knowledge factor enables a multifactor authentication system to perform at least a two factor authentication process with a single device (e.g., the token 102), thus eliminating the step of having the user enter a knowledge factor during the authentication process.

The token 102 can present the possession factor and the knowledge factor in a number of different ways, depending on the nature of the transaction requiring authentication. It is noted that presentation of the knowledge factor may not require actual delivery of the knowledge factor to the security system 100. For example, the token 102 may send an authentication package including either the knowledge factor or a verification of control, possession and/or knowledge of the knowledge factor, such as cryptographic verification.

For example, at an in-person point of sale, the token 102 can present the possession factor as visible indicia for reading by a human or machine, e.g., an Arabic number, a Machine Readable Code (MRC), a bar code, or a Quick Response (QR) code. Alternatively, the token 102 can present the possession factor via a dynamically writeable magnetic strip to provide back compatibility with existing point of sale infrastructure, or via short range wireless communication, e.g., NFC or Bluetooth, or via a wired interface, e.g., USB.

The visible indicia may be outputted through the output device 116 or a presentation device 128 separate from the output device 116. The presentation device 128 can be for demonstrating knowledge, possession, or control of the knowledge factor and/or the possession factor. As another example, possession and/or control of the possession factor and/or the knowledge factor may be presented through the first communication device 122. For example, the possession factor may be presented through a magnetic strip, via short-range wireless communication, e.g., near field communication (NFC) or Bluetooth, or via a wired interface, e.g., USB. If the possession factor is transmitted in a manner susceptible to eavesdropping, e.g., an unencrypted wireless link, the identifying characteristic of the possession factor may be changed on a periodic basis, to thwart any potential replay attacks.

Similarly, the token 102 can present an authentication package demonstrating control, possession, or knowledge of the cached knowledge factor from the cache memory 110. The authentication package may be presented as a visible pattern on a display for reading by a human or machine, e.g., an Arabic number, an MRC, a bar code, or a Quick Response (QR) code. Alternatively, the token 102 can present the authentication package via a dynamically writeable magnetic strip to provide back compatibility with existing point of sale infrastructure, or via short range wireless communication, e.g., NFC or Bluetooth, or via a wired interface, e.g., USB. As a specific example in the case of an electronic transaction over a communications network, e.g., Internet shopping, both the possession factor and authentication package can be presented over a secure communication channel, e.g., SSL, connection. It is noted that the possession factor and the knowledge factor can be presented as either separate messages or as a single message, such as having both factors included in the authentication package.

It should be noted that the security system 100 can safeguard either direct access or indirect access to a target destination via the multi-factor authentication process. For example, the two-factor authentication process can safeguard access to a list of passwords, i.e., a password keychain, stored in an encrypted manner on the security system 100. The knowledge factor can be a master passcode (e.g., key, password, or personal identification number) required for decryption of one or more passwords within the list. The master password can be cached within a memory onboard the token during a period of continuous possession. In this manner, a user's control and possession of the knowledge factor and the possession factor enable the user to access the password keychain, thus gaining indirect access to destinations that are accessible via the list of passwords.

Each of the modules (e.g., components or devices) of the token 102 and/or the security system 100 may operate individually and independently of other modules components. Some or all of the modules may be executed on the same host device or on separate devices. The separate devices can be coupled via a communication module to coordinate its operations. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The security system 100 and/or the token 102 may include additional, fewer, or different modules for various applications.

Figure 2:
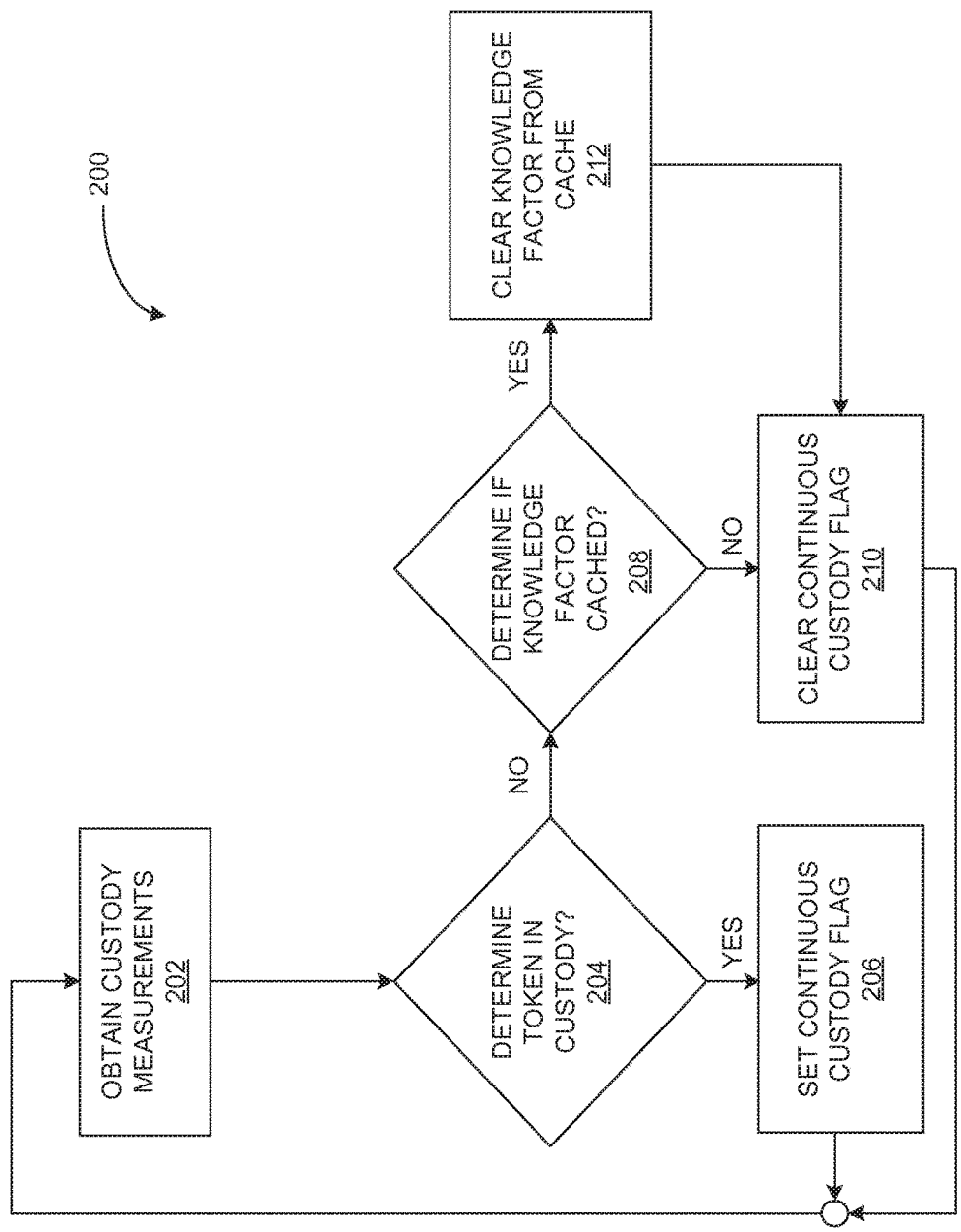
FIG. 2 is a flow diagram of a process for monitoring user custody of a token used to authenticate a user at a multi-factor authentication system.

FIG. 2 is a flow diagram of a process 200 for monitoring user custody of a token used to authenticate a user at a multi-factor authentication system. The token may be the token 102 of FIG. 1. The process 200 begins with the token obtaining custody measurements in step 202. The custody measurements may be taken from one or more sensors (e.g., the sensors 108 of FIG. 1) in the token. Based on these measurements, a controller (e.g., the controller 106 of FIG. 1) within the token determines custody status of the token in step 204. For example, the controller can detect if a locking mechanism associated with a wearable mechanism of the token is open (e.g., when the token is a wearable device). The locking mechanism can indicate that the token is being or has been removed by the wearer, thus compromising the custody of the token. In some embodiments, step 204 includes determining custody status particular to a specific user, such as via fingerprint recognition or eye recognition.

If the controller determines that the user has current custody of the token, the controller sets a continuous custody flag (e.g., the custody register 112 of FIG. 1) in step 206 and the token returns to obtain custody measurements as in step 202. If the user does not have current custody of the token as determined in step 204, the controller then determines if the token has cached the knowledge factor in step 208. For example, the controller can determine if the knowledge factor is stored in a cache memory (e.g., the cache memory 110 of FIG. 1) of the token or if a knowledge factor cache flag is set in the token. If not, the controller clears the continuous custody flag in step 210 and the token returns to obtain custody measurements in step 202. If the token has cached the knowledge factor as determined in step 208, the controller removes the cached knowledge factor from the cache memory in step 212, e.g., by repeatedly zeroing the memory location or overwriting the memory location with random data. Step 212 may include the token clearing the knowledge factor cache flag. After step 212, the controller then clears the continuous custody flag as in step 210 and returns to obtaining custody measurements as in step 202.

In some embodiments, the knowledge factor is preloaded onto the token without the user's knowledge. In these embodiments, if the controller determines that the token is no longer in user custody, instead of removing the cached knowledge factor from the cache memory, the controller prevents access to the preloaded knowledge factor until user custody is regained in step 212.

Figure 3:
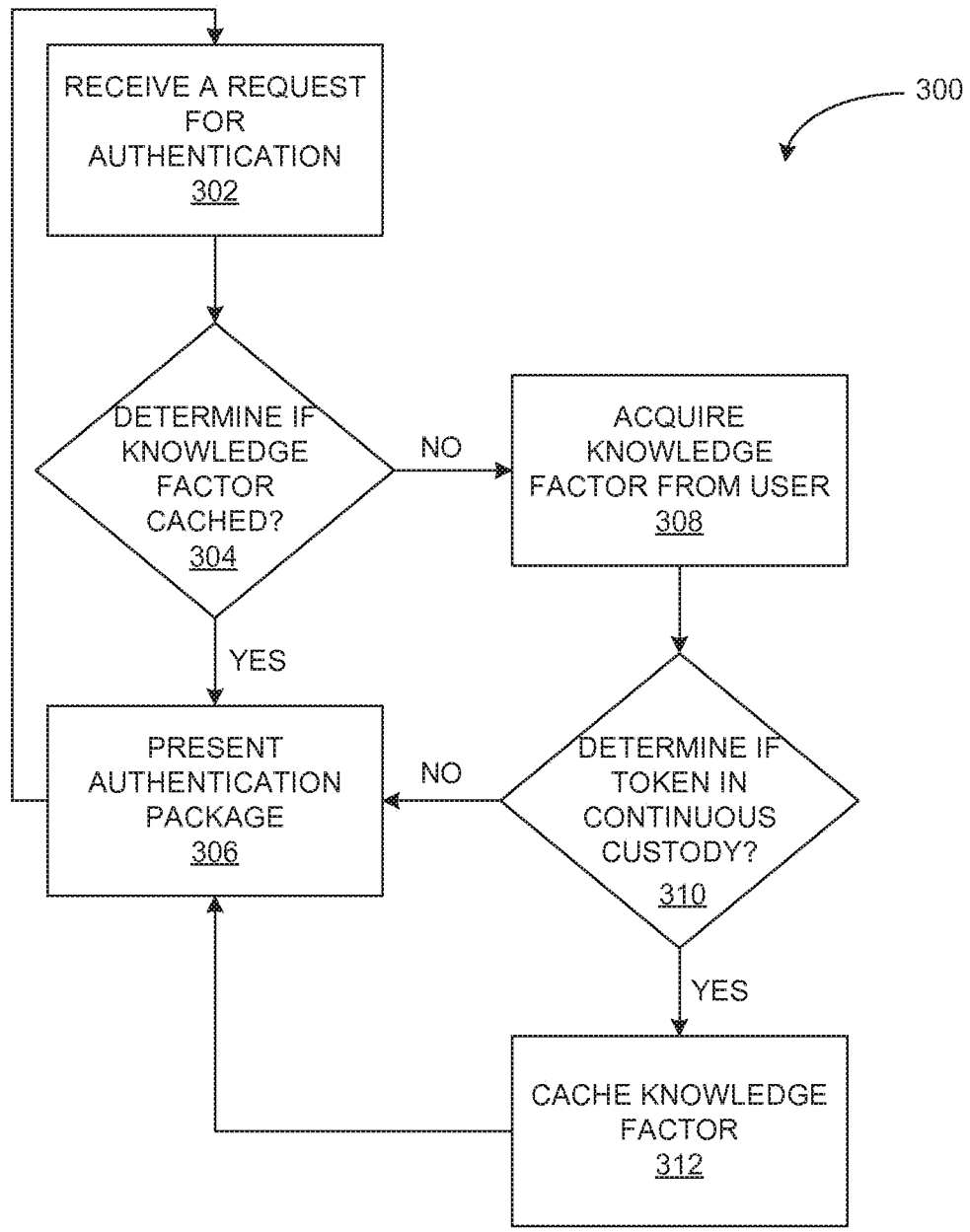
FIG. 3 is a flow diagram of a process for responding to authentication requests from a security system and caching a knowledge factor in a token.

FIG. 3 is a flow diagram of a process 300 for responding to authentication requests from a security system (e.g., the security system 100 of FIG. 1) and caching a knowledge factor in a token, such as the token 102 of FIG. 1. The process 300 may operate in conjunction with the process 200 of FIG. 2. The security system, for example, may include a multifactor authentication system including at least possession factor authentication and knowledge factor authentication. The process 300 illustrates a temporary combination of a knowledge factor and a possession factor by the token for use with the security system.

The process 300 includes the token receiving a request for authentication in step 302 and checking to determine if a knowledge factor is present in a cache memory (e.g., the cache memory 110 of FIG. 1) of the token (e.g., by inspecting a knowledge factor cache flag) in step 304. In embodiments where the knowledge factor is embedded or preloaded, step 304 may be skipped. If the cached knowledge factor is present, then the cached knowledge factor is presented to the security system requesting authentication in the form of an authentication package in step 306, and the controller then awaits further requests for authentication (e.g., leading to step 302). The authentication package comprises the knowledge factor or reliably demonstrates control, knowledge and/or possession of the knowledge factor. In some embodiments, the knowledge factor alone may serve as the authentication package. In other embodiments, the authentication package can include a message digest, computed with a cryptographic hash function operating on a message including the knowledge factor. Optionally, the authentication package may include a nonce provided by the security system requesting authentication or a hash of a nonce provided by the security system requesting authentication. In various embodiments, the authentication package may comprise the knowledge factor and additional information to satisfy the security system as a multifactor authentication system, such as biometric measurements of the user as an inherence authentication factor.

If the cached knowledge factor is not present as determined in step 304, the controller acquires the knowledge factor from the user in step 308 and determines if the token is within a period of continuous custody by the individual who is being authenticated by inspecting the continuous custody flag in step 310. If in step 310 the token is determined to be within the period of continuous custody, the token caches the knowledge factor in step 312. As part of step 312, the token can set the knowledge factor cache flag to an on state indicating presence of the knowledge factor in the cache memory. Upon caching the knowledge factor, the authentication package is presented to the security system requesting authentication as in step 306, and the controller then awaits further requests for authentication (e.g., leading up to step 302). If the controller determines that the token is not within a period of continuous custody, then the authentication package is presented to the security system requesting authentication as in step 306 without caching the knowledge factor. The controller then awaits further requests for authentication (e.g., leading up to step 302).

In some embodiments, a user can configure at least some of the operating parameters of the process 200 and the process 300 via a user setting stored on the token. Further, at least some of the operating parameters can be pre-configured by a factory setting of the token. The operating parameters may include the update frequency of the process 200, such as how frequently step 202 of obtaining custody measurement is performed. The operating parameters may also include a maximum allowable period of continuous custody beyond which the security system requires input of the knowledge factor from the user.

While processes or blocks are presented in a given order in FIGS. 2 and 3, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

FIG. 4 is a diagram of a bracelet token 400, in accordance with various embodiments. The bracelet token 400 may be the token 102 of FIG. 1. The bracelet token 400 includes a switch 402, which reports to a controller 404 (illustrated to be within the bracelet token 400 with dotted lines) whether the bracelet token 400 is securely fastened, such as securely fastened to a user's wrist (illustrated as transparent). The switch 402 may be the sensor 108 of FIG. 1. The controller 404 may be the controller 106 of FIG. 1.

The bracelet token 400 may include a flexible hinge 406. The flexible hinge 406 enables a body structure 408 of the bracelet token 400 to open and close. For example, the switch 402 may be opposite from the flexible hinge 406, where equal and opposite portions of the body structure 408 can couple with one another at the switch 402.

The bracelet token 400 further includes a keypad 410 and a display 412. The keypad 410 may be the interface device 114 of FIG. 1. The display 412 may be the output device 116 or the presentation device 128 of FIG. 1. The keypad 410 may be used to input a knowledge factor (e.g., a passcode, a PIN, or a security answer) to authenticate a user at a multifactor authentication system, such as a two-factor authentication system implementing knowledge factor authentication and possession factor authentication.

The display 412 may be used to provide feedback to the user as the user inputs the knowledge factor through the keypad 410. The display 412 may also be used as a communication device, such as the communication device 122 of FIG. 1, through optical means. The display 412 may also be a presentation device. For example, when the controller 404 receives an authentication request, from either the user through an input device or the keypad 410 or from the multifactor authentication system, the display 412 may present the possession factor and/or the knowledge factor, such as through an authentication package (e.g., as a visual image or a radio frequency message). In some embodiments, the possession factor and the knowledge factor can be presented as separate authentication packages/messages. In other embodiments, the possession factor and the knowledge factor can be presented as a single message/authentication package. That is, the bracelet token 400 can demonstrate control and/or possession of both the possession factor and the knowledge factor through the display 412 or through other output components. The authentication package may then be captured by the multifactor authentication system to authenticate the user. Similarly, the authentication package may be presented through wireless or wired communication.

FIG. 5A is a diagram of a security token system 500 implemented by a first sub-token 502 as exemplified by an ankle band and a second sub-token 504 as exemplified by a smartphone, according to at least one embodiment. The security token system 500 may be the token 102 of FIG. 1. As shown, the security token system 500 is a system comprising sub-tokens, including the first sub-token 502 and the second sub-token 504. The first sub-token 502 is attached to a user's body. For example, the first sub-token 502 may be a wearable device or a device that can be carried in a user's pocket, around the user's neck, limb, or other parts of the user's body. The first sub-token 502 may also be implanted in the user's body. The second sub-token 504 may reside outside the user's body to enable simpler presentation to demonstrate the user's control over a possession factor and a knowledge factor.

In the exemplified embodiment, the first sub-token 502 can monitor for whether the first sub-token 502 is under continuous user custody, such as via the custody register 112 of FIG. 1. The second sub-token 504 can communicate with the first sub-token 502. During a period of continuous user custody, a knowledge factor may be cached either on the first sub-token 502 or the second sub-token 504. The second sub-token 504 can be used to present control or possession of the cached knowledge factor and/or the possession factor for authentication at a security system 506, such as a laptop as shown or a computer server system coupled to the laptop shown.

Figure 5B:
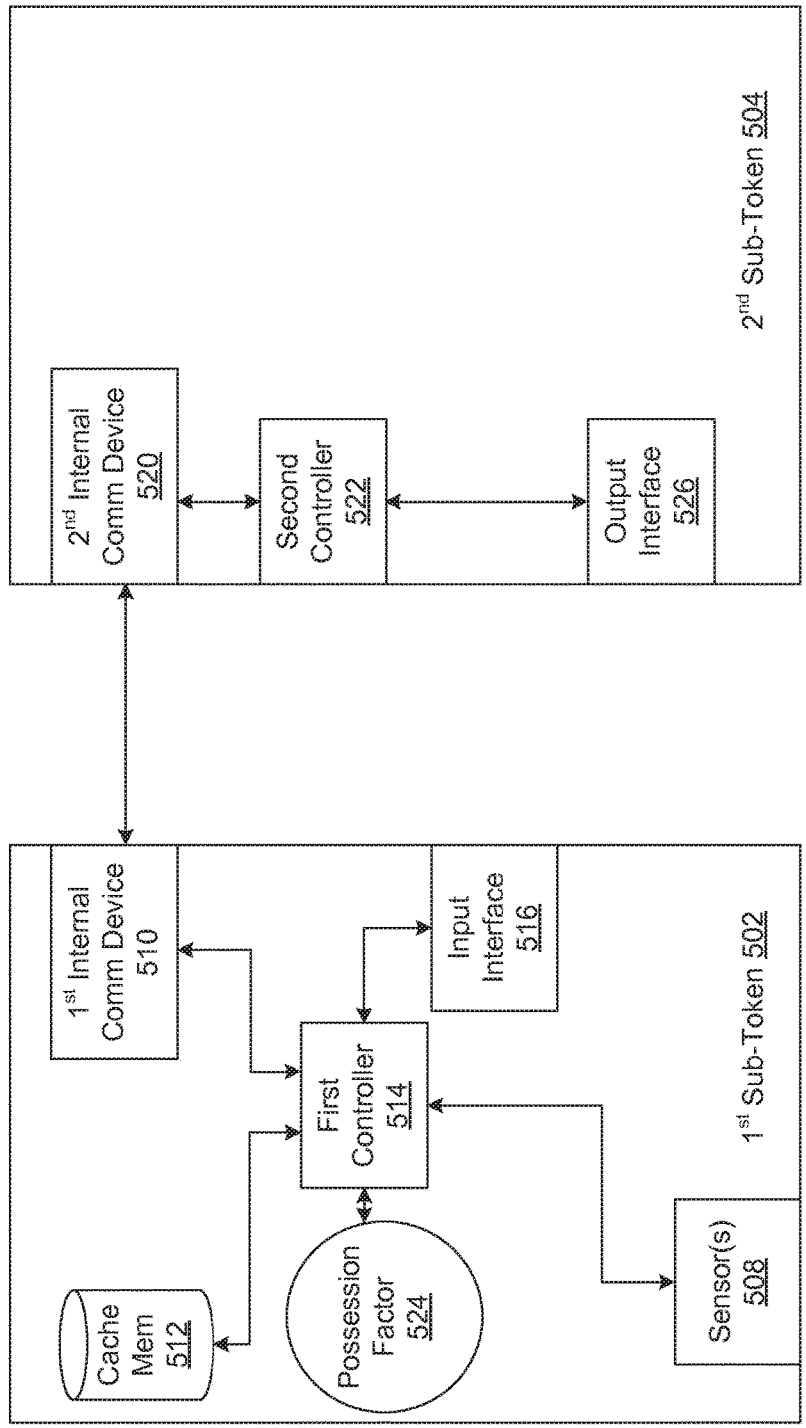
FIG. 5B is a block diagram of the security token system of FIG. 5A.

FIG. 5B is a block diagram of the security token system 500 of FIG. 5A. As illustrated, the first sub-token 502 may include one or more sensors 508. The one or more sensors 508 may be the one or more sensors 108 of FIG. 1. The sensors 508 may record measurements indicative of user custody, such as proximity between the first sub-token 502 and the user. The first sub-token 502 may include a first internal communication device 510 to communicate with the second sub-token 504, such as to communicate measurements related to user custody of the first sub-token 502. The first sub-token 502 may include a cache memory 512 to store temporarily the knowledge factor during a period of continuous user custody of the first sub-token 502. The first sub-token 502 may also include a first controller 514 to determine a period of continuous user custody of the first sub-token 502 based on measurements reported by the sensors 508.

In some embodiments, the cache memory 512 may be implemented in the second sub-token 504 (not shown). In some embodiments, the measurements reported by the sensors 508 are communicated to the second sub-token 504 from the first sub-token 502 through the internal communication device 510. An input interface 516 to receive user indication of the knowledge factor may be implemented on either the first sub-token 502 or the second sub-token 504.

The first sub-token 502 may be in wired or wireless communication with the second sub-token 504 through the first internal communication device 510. The second sub-token 504 may receive the communication via a second internal communication device 520. For example, the communication channel can be radiofrequency, optical, Bluetooth, magnetic, acoustic, or any combination thereof. In some embodiments, the second sub-token 504 may include a second controller 522, located onboard the second sub-token 504, that communicates with the first sub-token 502 to determine user custody from the measurements of the sensors 508. The second controller 522 can then determine whether to cache (or continue to cache) the knowledge factor received from the input interface 516 based at least in part on the determined user custody.

An identifying characteristic representative of a possession factor 524, such as the ID portion 104 of FIG. 1, may be permanently stored on the first sub-token 502 and communicated to the second sub-token 504. Alternatively, the identifying characteristic representative of the possession factor 524 may be stored on the second sub-token 504 (not shown). An output interface 526 may be implemented in the second sub-token 504. The output interface 526 can demonstrate to a security system, such as the security system 100 of FIG. 1, that the owner of the first sub-token 502 and the second sub-token 504 have control of both the possession factor and the knowledge factor. Such demonstration, for example, may be presented through a wireless communication, a wired channel message, a visual display, an audio output, a mechanical actuation, or any combination thereof.

In various embodiments, components and modules of the token 102 of FIG. 1 may be implemented in either the first sub-token 502 or the second sub-token 504. A single module of the security token system 500 may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. The first sub-token 502 and the second sub-token 504 may include additional, fewer, or different modules for various applications.

Computer Implementation

Figure 6:
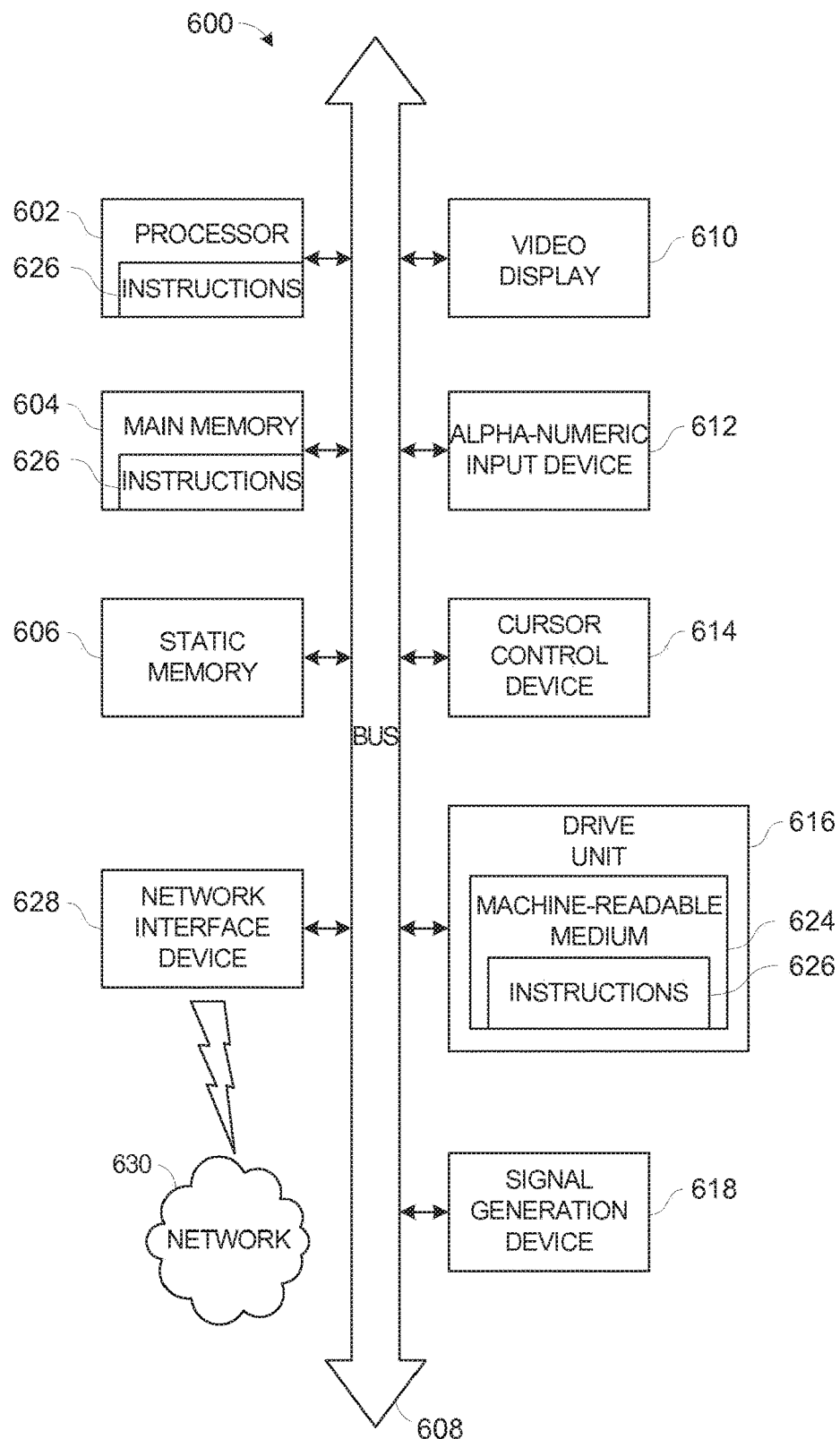
FIG. 6 is a block schematic diagram that depicts a machine in the exemplary form of a computer system within which a set of instructions for causing the machine to perform any of the herein disclosed methodologies may be executed.

FIG. 6 is a block schematic diagram that depicts a machine in the exemplary form of a computer system 600 within which a set of instructions for causing the machine to perform any of the herein disclosed methodologies may be executed. For example, the computer system 600 may be the security system 100 of FIG. 1 or as an embodiment of the token 102 of FIG. 1. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 600 includes a microprocessor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 628.

The disk drive unit 616 includes a machine-readable medium 624 on which is stored a set of executable instructions, i.e., software, 626 embodying any one, or all, of the methodologies described herein below. The software 626 is also shown to reside, completely or at least partially, within the main memory 604 and/or within the microprocessor 602. The software 626 may further be transmitted or received over a network 630 by means of a network interface device 628.

In contrast to the system 600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method of conducting a multi-factor authentication, the method comprising:
    monitoring a continuous user custody of a token having an identifier of the token representing a possession factor, wherein the token comprises two sub-tokens including a first sub-token and a second sub-token, wherein monitoring the continuous user custody comprises confirming the continuous user custody by monitoring continual proximity between the first sub-token and the second sub-token;
    during a period of continuous user custody determined based on the monitoring of the continuous user custody, maintaining a knowledge factor in a memory of the token; and
    during the period of continuous user custody determined based on the monitoring of the continuous user custody, and in response to an authentication request received from a security system separate and distinct from the token,
    (a) presenting the identifier of the token to the security system verifying the identifier of the token, thereby satisfying a possession factor authentication, and
    (b) automatically retrieving the knowledge factor from the memory of the token and presenting the knowledge factor to the security system verifying the knowledge factor, thereby satisfying a knowledge factor authentication.

2. The method of claim 1, comprising clearing the knowledge factor from the memory of the token in response to a break in the continuous user custody determined based on the monitoring of the continuous user custody.

3. The method of claim 1, wherein maintaining the knowledge factor in the memory includes pre-loading the knowledge factor in the memory prior to the period of continuous user custody.

4. The method of claim 1, further comprising during the period of continuous user custody, obtaining the knowledge factor from a user having the continuous user custody.

5. The method of claim 4, wherein obtaining the knowledge factor is in response to receiving another authentication request prior to the authentication request.

6. The method of claim 4, wherein during the period of continuous user custody, the user provides the knowledge factor for authentication only once.

7. The method of claim 1, wherein the continuous user custody of the token by a user is assured by reliably securing the token around or to the user's body.

8. The method of claim 1, wherein the token cannot be removed from the user's body without generating a signal that is detected by the token as a break in the continuous user custody of the token.

9. The method of claim 1, wherein the monitoring comprises: detecting a status of a switch or other sensor associated with the token; confirming constant contact between the token and the user's skin; continually acquiring biometric measurements of a user; or any combination thereof.

10. The method of claim 1, wherein the first sub-token is implanted within the user's body and the second sub-token is unattached to the user's body to demonstrate possession and knowledge of the possession factor and the knowledge factor, respectively, through the second sub-token.

11. The method of claim 1, wherein the knowledge factor comprises any of a personal identification number (PIN), a password, and a pattern.

12. The method of claim 1, further comprising demonstrating possession and knowledge of the possession factor and the knowledge factor, respectively, during a transaction requiring authentication at an in-person point of sale, wherein said demonstrating includes the token presenting the possession factor as a visible indication for reading by a human or machine.

13. The method of claim 1, further comprising presenting the possession factor via a visible indication, a magnetic strip, wireless communication, a wired interface, or any combination thereof.

14. The method of claim 1, further comprising presenting an authentication package for demonstrating knowledge of the knowledge factor via a visible indication, a magnetic strip, wireless communication, a wired interface, or any combination thereof.

15. The method of claim 1, further comprising periodically changing the possession factor to thwart potential replay attacks.

16. The method of claim 1, further comprising providing access to a list of passwords stored in an encrypted manner and associated with the token; wherein the knowledge factor is required for decryption of one or more passwords within the list.

17. An apparatus acting as a token to conduct a multi-factor authentication, the apparatus comprising:
a sensor to take measurements indicative of continuous user custody of the token, wherein the token comprises two sub-tokens including a first sub-token and a second sub-token, wherein monitoring the continuous user custody comprises confirming the continuous user custody by monitoring continual proximity between the first sub-token and the second sub-token;
a controller configured to monitor the measurements to determine a period of continuous user custody of the token;
a memory to cache a knowledge factor, the knowledge factor available during the period of continuous user custody;
an interface to receive authentication requests from a security system, wherein the security system is separate and distinct from the apparatus; and
an identifier of the token representing a possession factor satisfying possession factor authentication on the security system, wherein the knowledge factor is different from the identifier of the token representing the possession factor;
wherein, the controller is configured to automatically retrieve the identifier of the token of the token to demonstrate possession of the possession factor to the security system, in response to receiving an authentication request;
wherein, during the period of continuous user custody of the token, the controller is configured to retrieve the knowledge factor from the memory to demonstrate knowledge of the knowledge factor to the security system, in response to receiving the authentication request at the interface.

18. The apparatus of claim 17, further comprising an input device to receive the knowledge factor from a user during the period of continuous user custody; wherein, during the period of continuous user custody of the token, the controller is further configured to, responsive to receiving a previous authentication request at the interface, obtain the knowledge factor from the user through the input device and cache the knowledge factor in the memory.

19. The apparatus of claim 18, wherein the input device receives the knowledge factor as a personal identification number (PIN), a password, or a pattern.

20. The apparatus of claim 17, wherein the sensor is a switch, a skin contact sensor; or a biometric measurement device.

21. The apparatus of claim 17, the first sub-token with an attachment mechanism to attach to the user's body and the second sub-token unattached to the user's body to enable demonstration of possession and knowledge of the possession factor and the knowledge factor, respectively; wherein the controller is configured to confirm the period of continuous user custody by monitoring continual proximity between the first sub-token and the second sub-token via the sensor; and wherein each component of the token, including the controller and the memory, is either in the first sub-token or the second sub-token.

22. The apparatus of claim 17, wherein the controller is further configured to demonstrate possession of the possession factor by providing a visible indication for reading by a human or machine, by configuring a magnetic strip, or by transmitting a wireless or wired communication.

23. The apparatus of claim 17, the controller is further configured to demonstrate knowledge of the knowledge factor by providing a visible indication on the token, configuring a magnetic strip, or by transmitting a wireless or wired communication.

24. The apparatus of claim 17, wherein the memory stores a list of passwords, wherein the list is stored in an encrypted manner and associated with the token; and wherein the knowledge factor is required for decryption of one or more passwords within the list.

25. The apparatus of claim 17, further comprising a mechanism for reliably securing the token around or to the user's body, wherein the period of continuous user custody of the token by a user is assured when the mechanism is secured.

26. The apparatus of claim 17, further comprising a mechanism by which the token cannot be removed from the user's body without generating a signal that is detected by the controller as a break in the period of continuous user custody of the token.

27. The apparatus of claim 17, further comprising a body structure of the token in a form factor of: a bracelet, an anklet, a necklace, an earring, a clamping or securing device, a medallion, or a patch secured using an elastic band.

28. An apparatus comprising:
- a sensor to take measurements indicative of continuous user custody of the apparatus, wherein the apparatus comprises two sub-apparatuses including a first sub-apparatus and a second sub-apparatus, wherein monitoring the continuous user custody comprises confirming the continuous user custody by monitoring continual proximity between the first sub-apparatus and the second sub-apparatus;
- a controller configured to monitor the measurements to determine a period of continuous user custody of the apparatus;
- an identifier of the apparatus representing a possession factor of the apparatus, the possession factor of the apparatus satisfying possession factor authentication on a security system, wherein the identifier of the apparatus is adapted to be readable by the security system, and wherein the security system is separate and distinct from the apparatus;
- a memory to cache a knowledge factor to satisfy knowledge factor authentication on the security system, wherein the knowledge factor is different from the identifier of the apparatus representing the possession factor;
- an output component to automatically demonstrate the knowledge factor to the security system during the period of continuous user custody according to the period of continuous user custody; and
- wherein the knowledge factor is removed from the memory or prevented from being accessed when the period of continuous user custody ends.

29. The apparatus of claim 28, wherein the output component is configured to demonstrate the possession factor to the security system.

* * * * *